(12) United States Patent
Pal

(10) Patent No.: US 7,017,696 B2
(45) Date of Patent: Mar. 28, 2006

(54) ELECTRIC MOTOR VEHICLE WITH PASSENGER OPENING THROUGH RING MOTOR

(76) Inventor: Anadish Kumar Pal, 194 Vaishali, Pitampura, Delhi (IN) 110034

( * ) Notice: Subject to any disclaimer, the term of this patent is extended or adjusted under 35 U.S.C. 154(b) by 0 days.

(21) Appl. No.: 09/781,090

(22) Filed: Jan. 12, 2001

(65) Prior Publication Data

US 2004/0182625 A1    Sep. 23, 2004

Related U.S. Application Data

(60) Provisional application No. 60/182,772, filed on Feb. 14, 2000.

(51) Int. Cl.
*B62D 61/00* (2006.01)
(52) U.S. Cl. .................... 180/218; 180/6.5
(58) Field of Classification Search ............. 180/218, 180/65.1, 65.5; 280/205, 206, 207, 208
See application file for complete search history.

(56) References Cited

U.S. PATENT DOCUMENTS

| 282,299 | A | * | 7/1883 | Freeman | 180/218 |
| 3,313,365 | A | * | 4/1967 | Jackson | 180/218 |
| 4,163,567 | A | * | 8/1979 | Barber | 180/218 |
| 4,192,395 | A | * | 3/1980 | Barber | 180/218 |
| 5,894,902 | A | * | 4/1999 | Cho | 180/65.5 |
| 2001/0042650 | A1 | * | 11/2001 | Van Den Berg | 180/218 |

FOREIGN PATENT DOCUMENTS

| DE | 3103961 | * | 9/1982 | 180/218 |
| DE | 3626322 | * | 2/1988 | 180/218 |
| JP | 6092273 | * | 4/1994 | 280/206 |

* cited by examiner

*Primary Examiner*—Tony Winner

(57) ABSTRACT

A two-wheel electric vehicle with ringlike, large, powered parallel wheels, in which at least one ringlike wheel is driven by a large toroidal electric motor. The fully circular rotor of the large toroidal electric motor is integrated with the hub of the ringlike wheel, while the circular or semi-circular toroidal stator is joined to the body of the two-wheel electric vehicle, the ringlike wheel and the toroidal electric motor having a common bearing. The electric power source to drive the toroidal electric motor is located near the ground-facing portion of the vehicle body. An opening is formed in the internal circular area of the toroidal stator, to allow the entry and exit of the passengers of the vehicle. A similar small vehicle with parallel, coaxial wheels allows the occupant of the small vehicle to travel, seated either facing the conventional front or the rear of the small vehicle.

18 Claims, 3 Drawing Sheets

ELECTRIC MOTOR VEHICLE WITH PASSENGER OPENING THROUGH RING MOTOR

CROSS-REFERENCE TO RELATED APPLICATIONS

Provisional application No. 60/182,772, filed on Feb. 14, 2000.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Most of the contemporary electrically driven motor vehicles are designs which have been standardized with an internal-combustion machine as the power pack. As the internal-combustion engine runs best at an optimum rpm, and structurally has to be in a cubic form, the need to have gears and a lot other mechanical parts is always there.

While switching over to an electric-drive principle to run a motor vehicle, the first efforts had been to replace the internal-combustion engine with a high-rpm electric motor. But then there was this need to have a sizeable number of accumulators which, of course, would weigh down the vehicle considerably. It was difficult to create extra space for the accumulators; and changing the batteries in case of emergencies was cumbersome. Additionally, there had been a trend in the recent past to go for small-wheeled vehicles to reduce physical size and to increase maneuverability. This tended to increase the rolling friction between the wheels and the road surface, as the ratio between the chord which forms at the road contact and the circumference of the tire increases with increasingly smaller wheels. It is a major drawback for electric-vehicle design; reducing the range of the vehicle for a full battery charge.

There had been designs in the past which utilized an electric motor inside the wheel. On many occasions the wheel is turned into a wheel motor. But as there are no gears in the case of a direct-driven wheel motor, in order to generate high torques, either the diameter or the thickness of the wheels have to be increased: This makes the wheels heavy. To hold together those wheels, the axles and the chassis (or the shell) all have to be stronger and thus would be heavier than in a vehicle driven by a centrally located power pack.

How to do away with the numerous mechanical parts that weigh down an electric motor vehicle? And how to reduce the rolling friction to reduce the cruising power requirement of an electric motor vehicle? These were the two major pointers leading to this invention.

BRIEF SUMMARY OF THE INVENTION

This invention fully avoids the earlier problems by increasing the diameter and reducing the number of wheels. Ring-like or annulate wheels, two in number, get integrated with the vehicle body of the electric motor vehicle of the present invention, doing away with the conventional axle. The large diameter of a toroidal electric motor integrated with the annulate wheel, provides more amount of torque at slow speeds without using any gears. The vehicle body of this electric motor vehicle is basically in the font of a cylinder, the circular side of which faces the surface on which the vehicle travels; both the ends of the cylinder remain vertical, and these two ends also act as openings. The two annulate wheels are mounted near the two ends, one on either side. The hub of the annulate wheel houses the permanent-magnet toroidal rotor, while the toroidal stator with low-voltage windings is mounted on the basically cylindrical body of the electric motor vehicle, which acts as the axle for both the annulate heels. In principle, this electric motor vehicle is built inside an enlarged and hollowed out axle. The source of electric power possibly in the form of electrical energy storage devices are kept near that surface of the vehicle body the other side of which always faces the ground; this positioning of the electrical energy storage devices acting as the source of electric power, makes the center of gravity of the electric motor vehicle low and lends stability to the design—this is possible, because all the electrical energy storage devices like accumulators and superconductor assemblies are heavy. The two toroidal electric motors one on either annulate wheels, have individual drives controlled by electrical and/or electronic processing units for running the two toroidal electric motors and also effecting regenerative braking when needed. Steering is accomplished by differential rotation of the two annulate wheels. An electronic communication link between two or more such vehicles would enable all-thus-linked vehicles to travel as a train of identical vehicles, main steering being done by the vehicle on the front; this will simulate the present-day multi-wheel modes of transport, with the ease of detachability and flexibility.

Thus, this invention avoids the use of gears, a mechanical steering, suspensions and pneumatic tires; it has a much greater torque generation, compared to other motor-the-wheel designs. The rolling coefficient of friction is small, because the chord-versus-the-wheel-circumference ratio at the ground contact is low due to the increased effective diameter of the annulate wheel (which is more like a hub). This invention helps to increase the effective traveling range of an electrical vehicle with this novel structural design. As the source of electric power is placed at a level close to the ground, replacing them is easier compared to many existing designs of electric motor vehicles. With efficiency, simplicity and flexibility, this invention may be the harbinger of the imminent advent of a truly electrical motor vehicle.

The characteristic features of the invention are set forth, in particular, in the appended claims; however, the following description in detail in context to the drawings facilitates a greater understanding of the unique concepts this invention embodies. But this should be taken as illustrative, rather than restricting the scope of the ideas set forth in the section of claims. The principles and features of this invention may be utilized in applications outwardly dissimilar but in essence not departing from the scope of this invention.

DETAILED DESCRIPTION OF THE INVENTION

Figure 1:
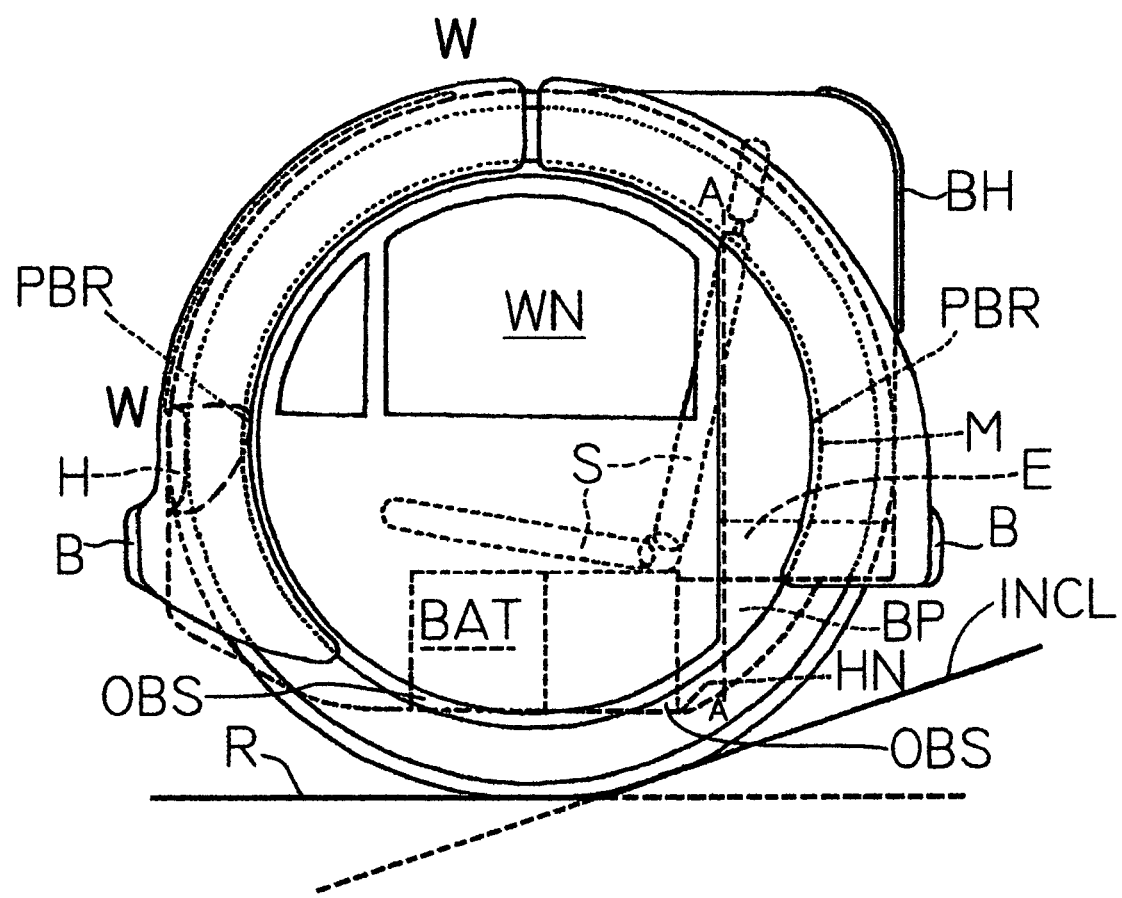
FIG. 1 is a side view of a two-wheel electric motor vehicle in accordance with the present invention where the two wheels are parallel to each other. The wheels are shown resting on level ground, as well as a plane with a 20° incline.
Figure 2:
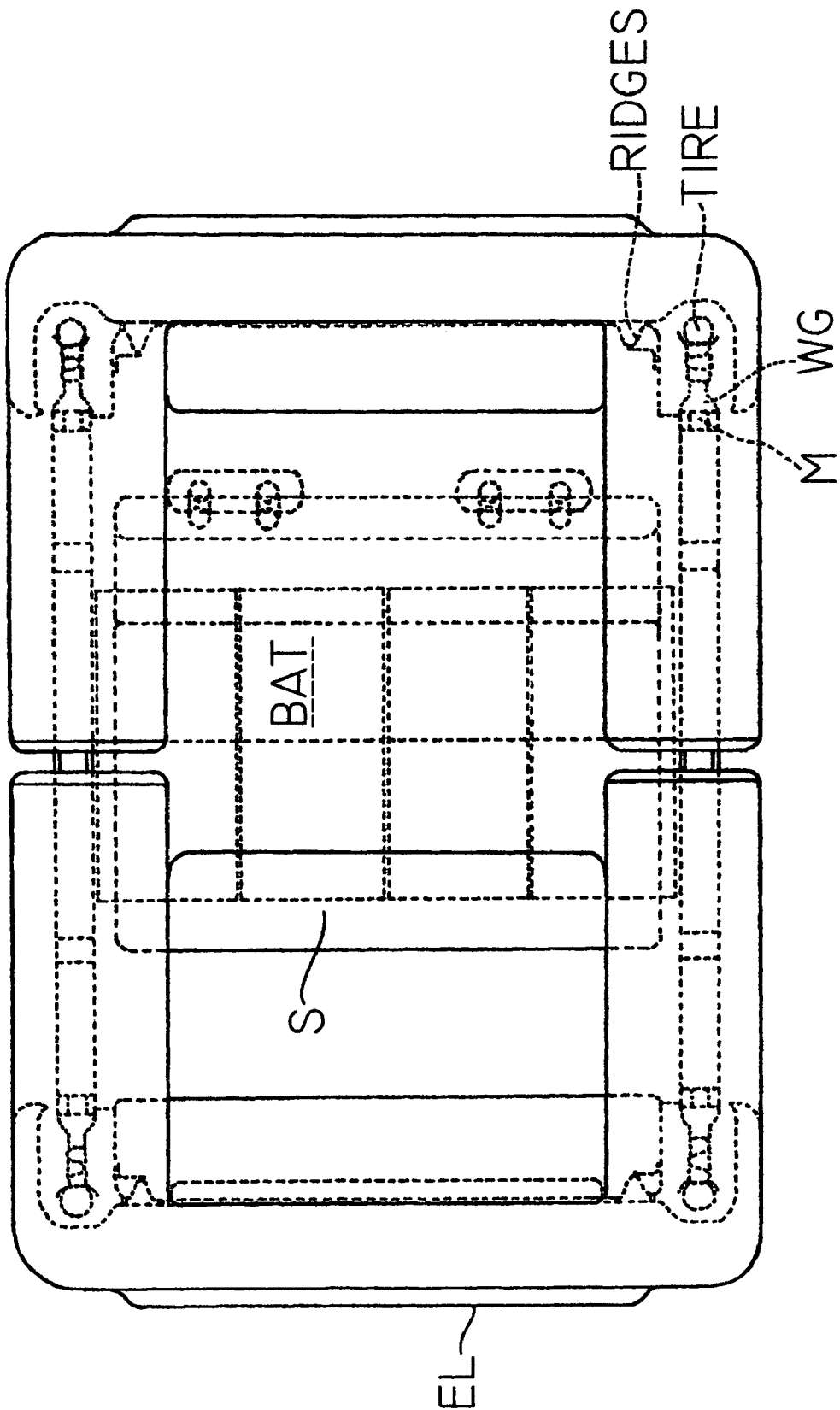
FIG. 2 is a plan view of the electric motor vehicle in accordance with the present invention, on a 11/2-times bigger scale than FIG. 1.
Figure 3:
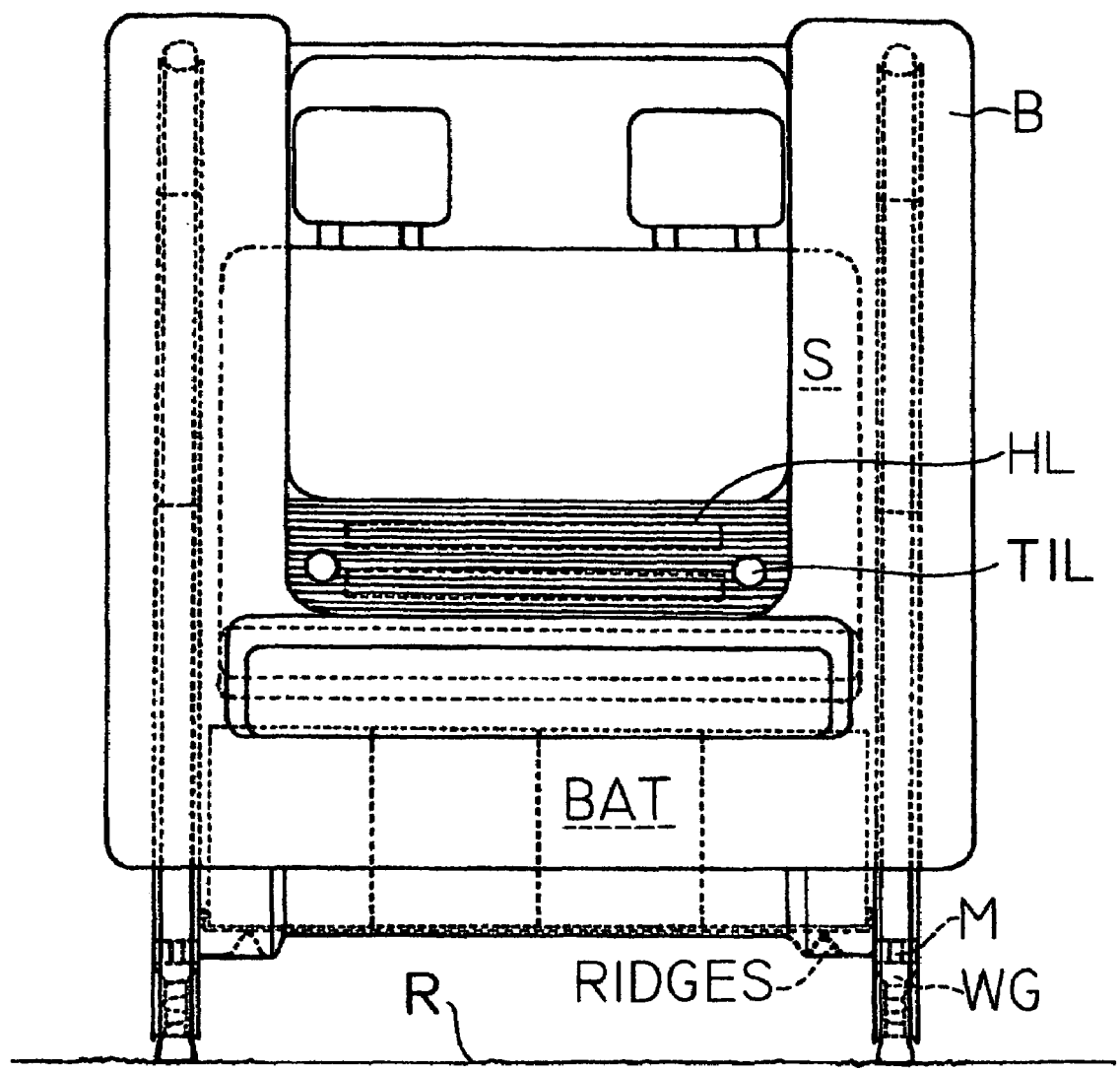
FIG. 3 is a general front view of the two-wheel electric motor vehicle where the wheels are parallel to each other in accordance with the present invention, on the same scale as used in FIG. 2. The two wheels are shown resting on level ground.

FIG. 1 shows the side view of the vehicle. The total height of the vehicle is nearly 50 inches. In this present form, it is designed to accommodate two persons with some luggage space at the back. The seats are marked S. The batteries, the source of electric power in this embodiment of the present invention, are placed below seats S, in battery enclosure BAT (FIG. 1, FIG. 2 and FIG. 3). There is a provision for keeping four lead acid batteries of 200AH, 12V rating. The total weight of the batteries is 240 kgs. The position of battery enclosure BAT keeps the center of gravity of the vehicle very low, this, coupled with the eccentric loading on the vehicle, provides stability to the vehicle, in spite of its having only two parallel annulate wheels. The batteries could be placed in two arrangements. One is side by side, so that the batteries could be taken out from the direction of BP in FIG. 1. Battery protector BP is made of material having good impact strength, capable of withstanding shock from the rear. A hinged joint at axis marked HN (FIG. 1), allows battery protector BP to swivel down and rest on the ground on its edge. Thus facilitating the removal or insertion of the batteries from the rear. The batteries could also be arranged in a transverse manner, as shown in FIG. 2. In this case, the batteries have to be accessed from the doors or the passenger openings on both the sides of the vehicle (FIG. 1). As the batteries, in this arrangement, are placed in the cavity behind toroidal electric motor M (FIG. 1 and FIG. 2), with the toroidal stator of toroidal electric motor M obstructing (indicated by OBS in FIG. 1) the bottom corners of the batteries, it is not possible to simply slide the batteries out, one by one. The backrests have to fold down on the seats, while the seats have an arrangement to get lifted slightly to make sufficient clearance for the batteries; a pneumatically operated rubber bag placed below the batteries as a collapsed cushion is inflated to get the batteries lifted enough to be able to slide them out. This arrangement is slightly more complicated than the earlier-described battery-removal procedure; but it makes the vehicle body stronger by integrating battery protector BP with the vehicle body, reducing the number of joints in the vehicle body. The top and front sides of battery enclosure BAT have to be strong and be fully linked to the structure of the vehicle body and, at the extremities, to toroidal electric motors M. So that, in case of an accidental collision, the batteries do not damage the legs of the occupants of the set as, the passengers. The linking of the two ends of the vehicle body with the elements of battery enclosure BAT also increases the overall strength of the vehicle body.

The backrests of seats S (FIG. 1, FIG. 2 and FIG. 3) could be adjusted somewhat to obtain different reclining angles. In FIG. 1, the areas marked B both on the front and rear indicate the lightweight plastic bumpers. They have an elevated face (FIG. 2) marked EL to offer a limited length of their full face in case of a collision, to avoid the shock getting transferred on to the annulate wheels and distorting them. Although, the ridged sheet-metal rims of the annulate wheels (FIG. 2) offer a degree of flexibility and resilience necessary to withstand the rough rides. The tires are large in diameter (nearly 50 inches), but are quite narrow. The application of this kind of tires, avoids making use of any kind of suspension or shock absorbers, reduces the rolling friction between the tires and road surface R (FIG. 1 and FIG. 3), and opens the possibility of using a solid low-cost rubber tire, shown as TIME in FIG. 3.

The passenger opening or the doors on both the sides of the vehicle hinge at the axis near the backrests of the seats (AA in FIG. 1); the height of the passenger openings is nearly 3 feet. The possible sliding glass portions of the window is marked WN in FIG. 1. The small area on the right-hand side of vertical axis AA (FIG. 1) is immovable and is fixed to the vehicle body. The passenger opening or the doors are fully encircled by the fully toroidal rotors. This arrangement utilizes the area of the inner circle of the outer toroidal form of toroidal electric motor M (shown clearly in FIG. 1).

The windscreen vertically, in a circular fashion, spans points WW (FIG. 1). The headlamps are placed in niche HL (FIG. 1)—shown more clearly in FIG. 3. In order to conserve power, use is made of two 20W fluorescent tubes driven by high frequency drivers. The right and left turn indicators are marked TIL in FIG. 3. The two fluorescent tubes with suitable cylindrical reflectors produce high and low beams; the Fresnel lenses in the path of light help to further focus the light beam.

On the rear-end side of the electric motor vehicle, there is a boot space, boot hatch door BH in FIG. 1. There are two locations for keeping the electrical and/or electronic connecting and processing units. One is the rear side of the seat backrests; the other is the place marked E in FIG. 1. The traction, steering, braking and communication with the remainder of the linked train of identical or similar vehicles are accomplished by using the speed data of the toroidal electric motors, with the help of the electrical and/or electronic connecting and processing units. There are two separate drives for the two toroidal, permanent-magnet ac motors shown as toroidal electric motor M (FIG. 1, FIG. 2 and FIG. 3). By altering the rpm of individual toroidal electric motors M, steering of the vehicle is achieved. By stopping one toroidal electric motor M entirely, the moving annulate wheel of the vehicle of the present invention draws a circle on the ground, the center of which is the point where the non-rotating annulate wheel rests on the ground; this capability makes the turning radius very small, equal to the distance between the two tires. Dynamic regenerative braking is also effected by the two drives; and is very effective, owing to the large diameter of the motor. The toroidal stator is either annular or semi-annular in axial profile, is wound for 24V dc, and is epoxy encapsulated. The toroidal rotor consists of small ferrite magnets arranged on the rotating hub. Instead of using ferrite or other permanent magnets for forming the fully toroidal rotor, use can also be made of electromagnetic pole pieces for constructing the fully toroidal rotor. The bearing of toroidal electric motor M is on the inside of the walls of the wine glass shape (WG in FIG. 2), adjacent to toroidal electric motor M in FIG. 2. At the parting lines of the toroidal rotor and the toroidal stator, to protect the bearing from dirt, there are thin annular rubber curtains, against which there is an optional positive air pressure from the inside of the toroidal stator—worked up by a small centrifugal pump which sucks filtered air from the inside of the vehicle and pushes it out through the leakage between the line of contact between the rubber curtain and the hub and the axle to prevent the entry of dust, dirt and water at low pressure heads.

In case of the failure of the switching devices of one or both the drives, there is a provision for two parallel stopping drives which otherwise work as regenerative brakes to first charge two capacitors from the regenerative braking power and then to step up the capacitor voltage with a switching converter to charge the batteries. To act as parking brakes, on points marked as (FIG. 1) PBR, there are two small dc motors with integral gears driving two threaded shafts which in turn move threaded sliding blocks lined on their heads with brake material. Application of this braking arrangement involves the rotation of the geared dc motors in the positive direction in order to move the braking sliders towards the toroidal rotor's magnetic face. When the brake linings press against the toroidal rotor face, due to the large diameter of the toroidal rotor, the braking effectiveness is very good. In order to release this parking brake, the direction of motor rotation is reversed, by reversing the connections to the small dc motors electrically. This braking is indispensable while parking, as there are no gears in this electric motor vehicle, and injecting a dc voltage in the toroidal rotor to achieve electromagnetic braking would unnecessarily drain the batteries.

Steering, speed and braking are manually controlled by operating a wired or cordless joystick which is connected to the electrical and/or electronic connecting and processing units; the driver may sit at any location in the vehicle. Ground clearance even on an inclined surface is adequately demonstrated with reference to the line marked INCL in FIG. 1.

The number of batteries could be made just two, to make the vehicle lighter and go faster, with the traveling distance getting halved. By making the driver sit in amore crouched manner, the diameter as well as the breadth of the vehicle could be reduced to produce a small vehicle, quite like the conventional bikes; but a stable vehicle primarily intended for a single passenger.

Dynamic towing is achieved by attaching one or more identical or similar vehicles behind or along the sides of a pilot vehicle. Electronic communication links between the vehicles permits the driver of the pilot vehicle to safely steer this train of identical vehicles; and puts into effect the splitting of a conventional four-wheel vehicle, or joining up, as and when required. The vehicles following the pilot vehicle have a user-defined degree of maneuverability. In another version of the present invention, the addition of a towing link in the form of hooks or hitches on the rear side of this electric motor vehicle will enable it to function as a traction vehicle inside factories. Unlike conventional three-wheeled electrical traction vehicles, the driver sits inside a well-defined and protected space, though the overall size of the vehicle is smaller compared to its existing counterparts.

The peculiarities of this electric motor vehicle design make it very stable in dynamic performance. While applying brakes, the vehicle body (in FIG. 1) tends to rotate along with the annulate wheels, but the heavy battery compartment keeps moving forward, canceling the likely anti-clockwise swing of the vehicle body. The position of the occupants of the vehicle always remains gravitationally the same, reducing, possibly, stress while traveling over inclines (INCL in FIG. 1).

The batteries, even if replaced by fuel cells or superconductor assemblies, always have one common feature—eight. The weight of the source of electric power in the form of electrical energy storage or generating units could not probably be reduced in near future. And in this design this concentration of weight lends itself remarkably well to the effective functioning of this electric motor vehicle.

To improve the dimensional stability of the vehicle body, ridges are formed on the sheet-metal vehicle body, just at the place where the vehicle body forms a neck to accommodate toroidal electric motor M, shown in FIG. 2 and FIG. 3 (RIDGES).

In a small, preferably single-seating version of the present vehicle, the backrest is in a foldable form; two such backrests linked to both the sitting edges of the driver seat make it possible for a passenger to sit inside the vehicle facing any of the two ends conventional front or rear—and drive, as there are no mechanical linkages for driving this vehicle; and the joystick controller could be operated from any position.

What is claimed is:

1. A vehicle comprising:
   at least one large annulate wheel with a large toroidal hub, and a correspondingly large toroidal axle joined to said vehicle to rotatably position and urge said large toroidal hub to effect rotatory movements of said large annulate wheel;
   at least one fully closed toroidal rotor with magnetic and/or electromagnetic means of an electric motor, attached to or integrated with said large toroidal hub;
   at least one stator with magnetic and/or electromagnetic means of said electric motor, attached to or integrated with said large toroidal axle;
   at least one opening fully encircled by said fully closed toroidal rotor with magnetic and/or electromagnetic means of said electric motor, which is large enough to allow the entry and exit of a passenger of said vehicle, through said large toroidal axle;
   a bearing means linked to said large toroidal hub and said large toroidal axle to decrease the friction between said large toroidal hub and said large toroidal axle during said rotatory movements of said large annulate wheel;
   a source of electric power conducts through electrical and/or electronic processing unit or units to said electric motor to rotatably urge said electric motor which mechanically transfers torque to said large annulate wheel; and
   at least one more of said large annulate wheel or any other wheel, placed at an axial distance from the first said large annulate wheel and linked rotatably to said vehicle, which is rotatably urged by a torque-giving power source.

2. A vehicle in accordance with claim 1, wherein said stator with magnetic and/or electromagnetic means of said electric motor is semi-annular in axial profile.

3. A vehicle in accordance with claim 1, wherein said electric motor is a permanent-magnet ac motor with or without magnetic sensors positioned on said stator with magnetic and/or electromagnetic means of said electric motor.

4. A vehicle in accordance with claim 1, wherein an addition of a set of hook or hitch means on the rear end of said vehicle converts said vehicle into a traction vehicle.

5. A plurality of vehicles with each vehicle in accordance with claim 1, wherein the first said vehicle has an electronic communication link means to exchange data from said electrical and/or electronic processing unit or units of the first said vehicle with data from said electrical and/or electronic processing unit or units of another said vehicle, and so on, to effect the formation of an electronically linked enumeration of vehicles; and said electronically linked enumeration of vehicles movably steered by the manipulation of said data from said electrical and/or electronic processing unit or units of the first said vehicle, mainly at the discretion of said passenger of the first said vehicle.

6. A vehicle in accordance with claim 1, wherein said opening fully encircled by said fully closed toroidal rotor with magnetic and/or electromagnetic means of said electric motor has full or partial cover means hinged or linked movably to said large toroidal axle or to said vehicle.

7. A vehicle comprising:
 at least one toroidal electric motor with the rotor and the stator of said toroidal electric motor forming toroidally;
 said rotor of said toroidal electric motor angularly and fully encircling said stator of said toroidal electric motor, the curved exterior of said rotor of said toroidal electric motor having aground-contact surface which permanently or occasionally remains in contact with the surface on which said vehicle travels;
 said stator of said toroidal electric motor angularly and fully encircled by said rotor of said toroidal electric motor having opening means disposed in the area of the inner circle of the outer toroidal form of said toroidal electric motor, for passage of the occupant or occupants of said vehicle;
 said stator of said toroidal electric motor linked with joining means to the body of said vehicle; and
 at least one powered wheel.

8. A vehicle in accordance with claim 7, wherein said stator of said toroidal electric motor is semi-annular in axial profile.

9. A vehicle in accordance with claim 7, wherein said toroidal electric motor is a permanent-magnet ac motor with or without magnetic sensors positioned on said stator of said toroidal electric motor.

10. A vehicle in accordance with claim 7, wherein an addition of a set of hook or hitch means on the rear end of said vehicle converts said vehicle into a traction vehicle.

11. A vehicle in accordance with claim 7, wherein said vehicle has an electronic communication link means to exchange data of said toroidal electric motor of said vehicle with data of another toroidal electric motor fully identical to said toroidal electric motor of another vehicle fully identical to said vehicle, and so on, to form an electronically linked train of vehicles, each vehicle from said electronically linked train of vehicles fully identical to said vehicle.

12. A vehicle in accordance with claim 7, wherein said opening means fully encircled by said rotor of said toroidal electric motor has or have full or partial cover means hinged or movably linked to said stator of said toroidal electric motor or to the body of said vehicle.

13. A vehicle, the center of gravity of said vehicle in the ground-contacting half of the horizontal section of said vehicle; said vehicle comprising:
 one large annulate wheel; said large annulate wheel comprising
  a large toroidal hub, and a correspondingly large toroidal axle joined to said vehicle to rotatably position and urge said large toroidal hub to effect rotatory movements of said large annulate wheel;
  at least one full rotor with magnetic and/or electromagnetic means of an electric motor, attached to or integrated with said large toroidal hub;
  at least one stator with magnetic and/or electromagnetic means of said electric motor, attached to or integrated with said large toroidal axle;
  at least one opening always fully encircled by said full rotor with magnetic and/or electromagnetic means of said electric motor, which is large enough to allow the entry and exit of the passenger of said vehicle, through said large toroidal axle;
  a bearing means linked to said large toroidal hub and said correspondingly large toroidal axle to decrease the friction between said large toroidal hub and said large toroidal axle during said rotatory movements of said large annulate wheel;
 one more said large annulate wheel placed apart from the first said large annulate wheel near-coaxially,
 a source of electric power connected by electrical and/or electronic connecting and processing units to each said electric motor on each said large annulate wheel, to rotatably urge each said electric motor which mechanically transfers a torque to each said large annulate wheel; and
 seating means to allow the passenger or passengers of said vehicle to sit at will facing any of the two ends of said vehicle, conventionally defined as the front end and the rear end.

14. A vehicle in accordance with claim 13, wherein said stator with magnetic and/or electromagnetic means of said electric motor is semi-annular in axial profile.

15. A vehicle in accordance with claim 13, wherein said electric motor is a permanent-magnet ac motor with or without magnetic sensors positioned on said stator with magnetic and/or electromagnetic means of said electric motor.

16. A vehicle in accordance with claim 13, wherein an addition of a set of hook or hitch means on the rear end of said vehicle converts said vehicle into a traction vehicle.

17. A vehicle in accordance with claim 13, wherein said vehicle has an electronic communication link means to exchange data from said electrical and electronic connecting and processing units of said vehicle with data from the electrical and electronic connecting and processing units of another vehicle, and so on, to form a linked train of vehicles; each vehicle from said linked train of vehicles is functionally identical with said vehicle and each of the electrical and electronic connecting and processing units is functionally identical with each of said electrical and electronic connecting and processing units.

18. A vehicle in accordance with claim 13, wherein said opening fully encircled by said full rotor with magnetic and/or electromagnetic means of said electric motor has full or partial cover means hinged or movably linked to said large toroidal axle or to said vehicle.

* * * * *